United States Patent [19]
Willis

[11] 4,390,820
[45] Jun. 28, 1983

[54] TELEVISION RECEIVER FERRORESONANT LOAD POWER SUPPLY DISABLING CIRCUIT

[75] Inventor: Donald H. Willis, Indianapolis, Ind.

[73] Assignee: RCA Corporation, New York, N.Y.

[21] Appl. No.: 298,973

[22] Filed: Sep. 3, 1981

[51] Int. Cl.³ .............................................. H01J 29/70
[52] U.S. Cl. .................................... 315/411; 358/190; 358/243
[58] Field of Search ................. 315/411; 358/190, 243

[56] References Cited

U.S. PATENT DOCUMENTS

| | | | |
|---|---|---|---|
| 3,433,896 | 3/1969 | Sakai et al. | 178/7.3 |
| 3,798,369 | 3/1974 | Dietch | 178/7.5 R |
| 3,798,493 | 3/1974 | Manske | 315/8 |
| 3,798,497 | 3/1974 | Manske | 315/29 |
| 3,868,538 | 2/1975 | Blanchard | 315/411 |
| 3,955,115 | 5/1976 | Manske | 315/8 |
| 3,970,915 | 7/1976 | Suchko | 321/21 |
| 4,262,245 | 4/1981 | Wendt | 323/308 |

FOREIGN PATENT DOCUMENTS 2041668  9/1980  United Kingdom .

OTHER PUBLICATIONS

General Electric Technical Training Manual Supplement, EC-N Chassis & Schematic, published 12/79.

*Primary Examiner*—Theodore M. Blum
*Attorney, Agent, or Firm*—E. M. Whitacre; P. J. Rasmussen; Joseph Laks

[57] ABSTRACT

The primary winding of a high leakage transformer is coupled to a source of alternating input voltage for developing an alternating supply voltage across a secondary winding of the transformer. A self-regulating, ferroresonant load circuit includes a saturable reactor that has a first winding coupled to the transformer secondary winding for regulating the supply voltage. A high voltage winding of the transformer steps up the supply voltage. The stepped up voltage is rectified to produce an ultor accelerating potential for a color picture tube of a television receiver. If the saturable reactor first winding is disconnected from the transformer secondary winding, the supply voltage and ultor accelerating potential undesirably tend to increase in amplitude. To protect against the emission of excessive X-radiation from the phosphor screen of the picture tube in such an event, the heater filaments of the picture tube cathode electrodes are energized by a second winding of the saturable reactor. If the saturable reactor first winding becomes disconnected, heater energization is removed, producing a blank picture screen.

8 Claims, 1 Drawing Figure

U.S. Patent
Jun. 28, 1983
4,390,820
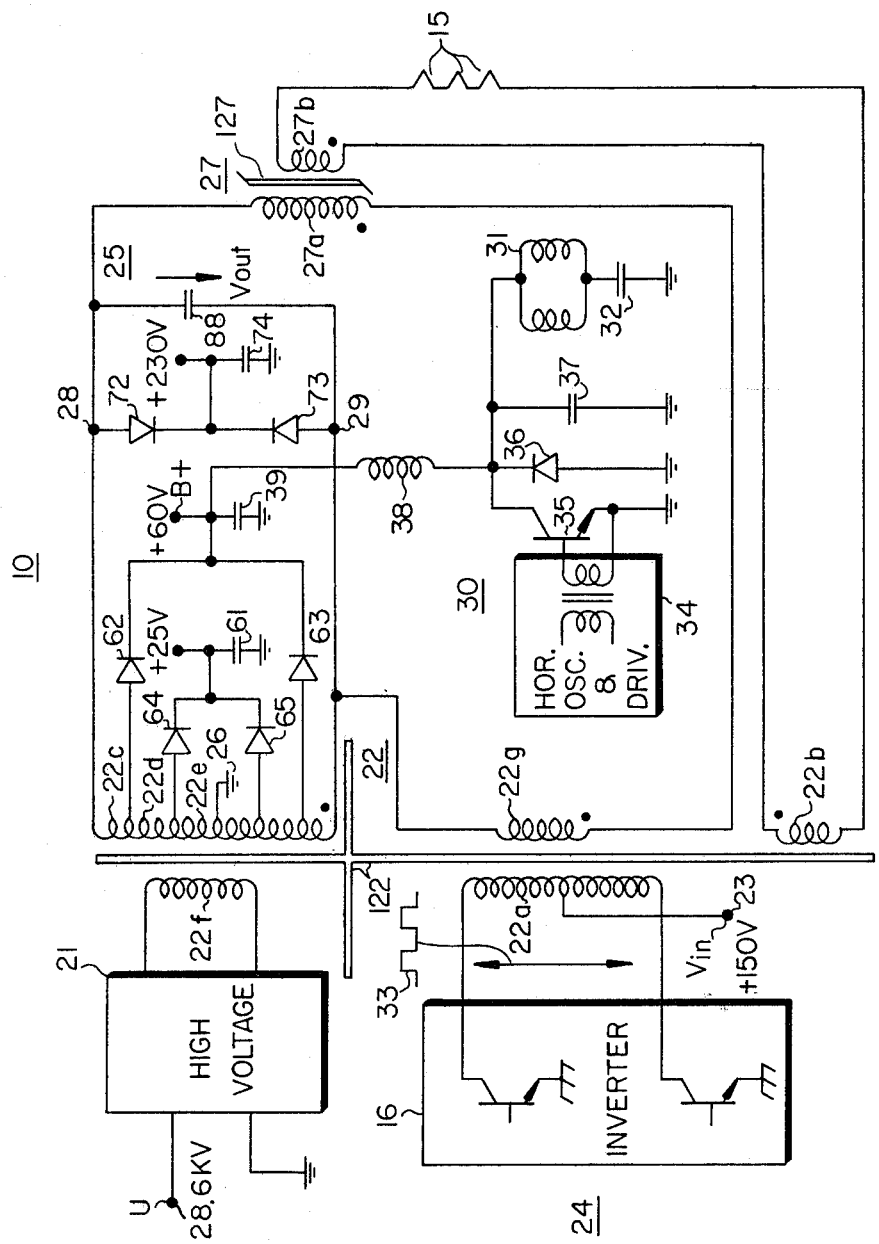

TELEVISION RECEIVER FERRORESONANT LOAD POWER SUPPLY DISABLING CIRCUIT

This invention relatrs to television receiver ferroresonant power supply disabling circuits.

A ferroresonant power supply may be used to provide a regulated ultor voltage and a regulated B+ scanning voltage for a television receiver. When operated at a relatively high input frequency, such as the horizontal deflection frequency of about 16 KHz, a ferroresonant power supply is a relatively compact and low weight unit that provides inherent output voltage regulation without the need for a relatively complex and expensive electronic regulator control circuit.

In the U.S. patent applications of D. H. Willis, Ser. No. 220,847, filed Dec. 29, 1980, entitled "TELEVISION RECEIVER FERRORESONANT LOAD POWER SUPPLY", and Ser. No. 255,396, filed Apr. 20, 1981, entitled "TELEVISION RECEIVER FERRORESONANT LOAD POWER SUPPLY WITH REDUCED SATURABLE REACTOR CIRCULATING CURRENT", now U.S. Pat. No. 4,353,014, both herein incorporated by reference, a ferroresonant power supply is described wherein a source of unregulated alternating polarity voltage is coupled to the primary winding of a high leakage inductance power transformer. A ferroresonant saturable reactor load circuit is coupled across a secondary output winding of the high leakage transformer. A plurality of other secondary output windings, including a high voltage output winding, are magnetically tightly coupled to the first-mentioned secondary output winding.

Various television receiver direct voltages are derived from the alternating polarity voltages developed across the transformer secondary windings, including an ultor accelerating potential derived from the voltage developed across the high voltage winding and a B+ scanning voltage derived from the voltage developed across a low voltage winding. The ferroresonant load circuit regulates the voltage developed across one of the transformer secondary windings, thereby regulating the voltages developed across all the other tightly coupled secondary windings.

The self-regulating or ferroresonant load circuit comprises a saturable reactor and a capacitor coupled across the high leakage transformer secondary output winding. During each half cycle of the alternating polarity output voltage, the core of the saturable reactor magnetically saturates to develop a circulating current between the capacitor and a winding of the saturable reactor, thereby regulating, by ferroresonant operation, the alternating polarity output voltage. In the second of the aforementioned Willis U.S. patent applications, an additional winding of the high leakage transformer, magnetically tightly coupled to the transformer primary winding, is conductively coupled in series with the ferroresonant saturable reactor winding across the ferroresonant load circuit capacitor and between two terminals of the transformer secondary output winding. Such an arrangement enables the ferroresonant load circuit to provide relatively good output voltage regulation at reduced circulating current levels.

A fault operating condition may arise wherein the saturable reactor winding becomes disconnected from the transformer secondary winding. In such a situation, the transformer secondary output voltages and the ultor accelerating potential undesirably tend to increase in amplitude. A feature of the invention is the incorporation within the ferroresonant power supply of a disabling circuit that disables a load circuit within the television display system under this type of fault operating condition. The television display system load circuit is normally energized by the voltage developed across the saturable reactor winding. If this winding becomes disconnected from the high leakage transformer, normal energization of the television display system load circuit is disrupted.

In a specific embodiment of the invention, the television display system load circuit comprises a heater filament of a picture tube cathode electrode. Power for the heater filament is obtained from a second winding of the ferroresonant load circuit saturable reactor. When the first winding of the saturable reactor becomes disconnected from the high leakage transformer, producing an undesirable increase in ultor accelerating potential, power for the heater filament is simultaneously terminated. A blank picture screen is presented and emission of X-radiation is prevented.

The FIGURE illustrates a television receiver deflection circuit and ferroresonant power supply incorporating a disabling circuit embodying the invention.

In the FIGURE, a power supply 10 for a television receiver or television display system includes a source 24 of alternating input voltage 33 and a high leakage inductance power transformer 22. Alternating voltage source 24 comprises a source of direct voltage, Vin, developing illustratively +150 volts at an input terminal 23, and a high frequency inverter 16 coupled to the primary winding 22a of power transformer 22. Input terminal 23 is coupled to a center tap of primary winding 22a. Inverter 16 is operated at a relatively high frequency, such as the horizontal deflection frequency of illustratively 15.75 KHz, to develop across primary winding 22a the rectangular or square-wave voltage 33. Square-wave voltage 33, when applied to primary winding 22a, develops an alternating polarity supply voltage across each of secondary output windings 22c–22f of transformer 22. Secondary windings 22c–22e have a common chassis ground center tap 26.

The alternating polarity output or supply voltage developed across winding 22c is full-wave rectified by diodes 72 and 73 and filtered by capacitor 74 to develop a direct supply voltage, of illustratively +230 volts, to power such circuits as the television receiver picture tube driver circuits. The alternating polarity output voltage developed across winding 22e is full-wave rectified by diodes 64 and 65 and filtered by a capacitor 61 to develop a direct supply voltage, of illustratively +25 volts, to power such television receiver circuits as the vertical deflection and audio circuits. The alternating polarity output voltage developed across winding 22d is full-wave rectified by diodes 62 and 63 and filtered by a capacitor 39 to develop, at a B+ terminal, a B+ scan supply voltage to energize a horizontal deflection generator circuit 30.

Horizontal deflection circuit 30 comprises a horizontal oscillator and driver 34, a horizontal output transistor 35, a damper diode 36, a retrace capacitor 37, and an S-shaping or trace capacitor 32 coupled in series with a horizontal deflection winding 31 across horizontal output transistor 35. Horizontal deflection generator 30 is coupled to the B+ terminal through an inductor 38 and develops a horizontal scanning current in horizontal deflection winding 31.

The alternating polarity voltage developed across a high voltage winding, secondary winding 22f, is coupled to a high voltage circuit 21 to develop an ultor accelerating potential at a terminal U for a color picture tube anode electrode, not illustrated, of the television receiver. High voltage circuit 21 may comprise a conventional voltage multiplier circuit of the Cockroft-Walton type, or may comprise a half-wave rectifier arrangement with a plurality of diodes integrally molded as a single unit with a plurality of winding sections, the winding sections not being individually illustrated in winding 22f.

The output voltage Vout across secondary output winding 22c, between terminals 28 and 29, is regulated by the ferroresonant operation of a ferroresonant load circuit 25. Ferroresonant load circuit 25 comprises a saturable reactor 27 including a magnetizable core 127 and a winding 27a located thereon, a capacitor 88 coupled between terminals 28 and 29, and a winding 22g of transformer 22 magnetically tightly coupled to winding 22a and conductively coupled in series with saturable reactor winding 27a across capacitor 88.

By being coupled to transformer secondary output winding 22c, ferroresonant load circuit 25 acts as a regulating load circuit to maintain the voltage across winding 22c as the regulated voltage Vout. With the voltage across secondary output winding 22c regulated by the ferroresonant operation of ferroresonant load circuit 25, the output voltages across all the other secondary windings that are tightly coupled to winding 22c, including high voltage winding 22f, are also regulated. Because of the loose magnetic coupling between primary winding 22a and the secondary windings 22c-22f, the voltages across these secondary windings can remain relatively unchanged in amplitude or half-cycle area, even though the voltage across the primary winding varies in amplitude.

Transformer 22, in combination with capacitor 88, develops an exciting current for saturable reactor winding 27a to generate a combined magnetic flux in core 127 that links winding 27a to produce the alternating polarity output voltage Vout. To regulate Vout by ferroresonant operation, capacitor 88 generates a circulating current during each half cycle of the alternating polarity output voltage that aids in magnetically saturating the core section of magnetizable core 127 that is associated with reactor winding 27a. As the saturable core section goes into saturation and comes out of saturation, the inductance exhibited by saturable reactor winding 27a switches between a low inductance state and a high inductance state. Under control of this switching action, which is a function of the saturation characteristics of the magnetizable material of core 127, the amplitude of the output voltage, the half-cycle area of the output voltage, or both the amplitude and half-cycle area are regulated against changes in the amplitude of the input voltage Vin and against changes in the loading on the various supply terminals including the ultor supply terminal U.

With the winding polarity of transformer winding 22c relative to winding 22g as shown in the FIGURE, the regulated output voltage Vout equals the difference between the voltage developed across saturable reactor winding 27a, the voltage being referenced to the undotted terminal of winding 27a, and the voltage developed across transformer winding 22g, the voltage being referenced to the undotted terminal of winding 22g. Such an arrangement provides for relatively good regulation of the voltage Vout at relatively low circulating current levels in ferroresonant load circuit 25. Because of the subtractive relationship of the aforementioned two voltages, an increase in the voltage across saturable reactor winding 27a due, for example, to an increase in the unregulated voltage Vin, is offset by an increase in the voltage across transformer winding 22g, thereby maintained the output voltage Vout substantially unchanged in amplitude, half-cycle area, or both.

A fault operating condition may arise wherein saturable reactor winding 27a becomes disconnected from secondary output winding 22c, or becomes internally disconnected or open-circuited. With reactor winding 27a operatively disconnected, the output voltage Vout tends to increase substantially. The voltage Vout increases because the high leakage transformer 22 is no longer being loaded down by its connection to ferroresonant load circuit 25. Also, should capacitor 88 at the same time become disconnected from terminal 28 or 29, the voltage Vout may increase. The increase in voltage Vout under this fault operating condition tends to undesirably increase the ultor accelerating potential at terminal U.

A feature of the invention is the disabling of the normal energization of a television display system load circuit under such a fault operating condition. To protect against the generation of excessive X-radiation when the ultor voltage tends to undesirably increase, the load circuit selected for disabling is the energizing circuit for the filaments 15 of the cathode electrodes of the color picture tube. Heater filaments 15 are energized by the voltage developed across a second winding 27b of saturable reactor 27.

Under a fault operating condition when saturable reactor winding 27a becomes operatively disconnected from transformer winding 22c, the voltages across both winding 27a and winding 27b are substantially eliminated. Normal energization of heater filaments 15 is sufficiently disrupted to prevent significant electron emission from the cathode electrode surfaces, thereby resulting in a blank picture tube screen being produced. Thus, although the ultor accelerating potential may tend to increase when saturable reactor winding 27a is disconnected, no emission of X-radiation is possible because the heater filaments are at the same time deenergized.

A winding 22b magnetically tightly coupled to transformer primary winding 22a is conductively coupled in series with saturable reactor winding 27b across heater filaments 15. The voltages developed by saturable reactor winding 27b and transformer winding 22b are in a subtractive relationship so as to apply a substantially regulated voltage across heater filaments 15. The voltage appearing across transformer winding 22b is, by itself, insufficient to properly energize the heater filaments 15 if saturable reactor winding 27a becomes disconnected.

I claim

1. A disabling circuit for a television display system, comprising:
    a source of input voltage;
    a transformer including primary and secondary windings; said primary winding being coupled to said source for developing an alternating supply voltage across said secondary winding;
    a self-regulating load circuit including a saturable reactor having a first winding coupled to said transformer secondary winding for regulating said supply voltage;

a tertiary winding of said transformer for stepping up said regulated supply voltage;

a high voltage circuit coupled to said tertiary winding for developing an ultor accelerating potential for a picture tube of said television display system;

a load circuit within said television display system; and means coupled to said television display system load circuit and to said saturable reactor first winding for energizing said television display system load circuit such that the disconnection of said saturable reactor first winding from said transformer secondary winding disables the normal energization of said television display system load circuit.

2. A disabling circuit according to claim 1 wherein said energizing means comprises a second winding of said saturable reactor.

3. A disabling circuit according to claims 1 or 2 wherein said television display system load circuit comprises a heater filament of said picture tube.

4. A disabling circuit according to claim 1 wherein said supply voltage tends to increase in amplitude when said saturable reactor first winding is disconnected from said transformer secondary winding.

5. A disabling circuit according to claim 4 wherein substantial leakage inductance exists between said transformer primary and secondary windings.

6. A disabling circuit according to claim 5 wherein said television display system load circuit comprises a heater filament of said picture tube.

7. A disabling circuit according to claim 6 wherein said energizing means comprises a second winding of said saturable reactor.

8. A disabling circuit according to claim 7 wherein said transformer includes a fourth winding magnetically tightly coupled to said transformer primary winding and wherein said self-regulating load circuit includes a capacitance coupled between two terminals of said transformer secondary winding and coupled across the series arrangement of said saturable reactor first winding and said transformer fourth winding.

* * * * *